(12) United States Patent
Iwasaki

(10) Patent No.: US 9,884,519 B2
(45) Date of Patent: Feb. 6, 2018

(54) PNEUMATIC TIRE

(71) Applicant: Sumitomo Rubber Industries, Ltd., Kobe-shi, Hyogo (JP)

(72) Inventor: Satoshi Iwasaki, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 69 days.

(21) Appl. No.: 14/912,768

(22) PCT Filed: Sep. 1, 2014

(86) PCT No.: PCT/JP2014/072905
§ 371 (c)(1),
(2) Date: Feb. 18, 2016

(87) PCT Pub. No.: WO2015/037464
PCT Pub. Date: Mar. 19, 2015

(65) Prior Publication Data
US 2016/0193886 A1 Jul. 7, 2016

(30) Foreign Application Priority Data
Sep. 11, 2013 (JP) ................................. 2013-188653

(51) Int. Cl.
*B60C 11/03* (2006.01)
*B60C 11/13* (2006.01)
*B60C 11/12* (2006.01)

(52) U.S. Cl.
CPC ...... *B60C 11/1315* (2013.01); *B60C 11/0306* (2013.01); *B60C 11/0309* (2013.01);
(Continued)

(58) Field of Classification Search
CPC ............. B60C 11/1315; B60C 11/0306; B60C 11/0327; B60C 11/12; B60C 11/1369;
(Continued)

(56) References Cited

U.S. PATENT DOCUMENTS 5,361,816 A * 11/1994 Hitzky ................ B60C 11/0306
152/209.22
8,763,659 B2 * 7/2014 Ishiguro .............. B60C 11/0306
152/209.22
(Continued)

FOREIGN PATENT DOCUMENTS

EP 1123819 A2 8/2001
EP 2620299 A1 7/2013
(Continued)

OTHER PUBLICATIONS

Extended European Search Report, dated Apr. 6, 2017, for European Application No. 14843545.6.
(Continued)

*Primary Examiner* — Jodi C Franklin
(74) *Attorney, Agent, or Firm* — Birch, Stewart, Kolasch & Birch, LLP

(57) ABSTRACT

A middle land portion is divided into multiple middle blocks by first middle transverse grooves and second middle transverse grooves arranged alternately in the tire circumference direction. The first middle transverse grooves include a first groove portion which communicates with a crown main groove, and a second groove portion which communicates with a shoulder main groove and is less wide than the first groove portion; the second middle transverse grooves include a third groove portion) which communicates with the shoulder main groove, and a fourth groove portion which communicates with a crown main groove and is less wide than the third groove portion. The middle land portion has first middle slots which are disposed near a second groove (Continued)

portion, extend from the shoulder main groove towards the crown main groove and end within the middle land portion, and second middle slots which are disposed near fourth groove portions, extend from the crown main groove towards the shoulder main groove and end within the middle land portion.

12 Claims, 6 Drawing Sheets

(52) U.S. Cl.
CPC .......... *B60C 11/0327* (2013.01); *B60C 11/12* (2013.01); *B60C 11/1369* (2013.01); *B60C 2011/0334* (2013.01); *B60C 2011/0341* (2013.01); *B60C 2011/0353* (2013.01); *B60C 2011/0355* (2013.01); *B60C 2011/0365* (2013.01); *B60C 2011/0369* (2013.01); *B60C 2011/0381* (2013.01); *B60C 2011/0383* (2013.01); *B60C 2011/0388* (2013.01); *B60C 2011/0395* (2013.01); *B60C 2011/1209* (2013.01)

(58) Field of Classification Search
CPC ............. B60C 11/0334; B60C 11/0341; B60C 11/0353; B60C 11/0355; B60C 11/0365; B60C 11/0369; B60C 11/0381; B60C 11/0383; B60C 11/0388; B60C 11/0395; B60C 11/1209
See application file for complete search history.

(56) References Cited

U.S. PATENT DOCUMENTS

| | | | |
|---|---|---|---|
| 2005/0183807 A1 | 8/2005 | Hildebrand | |
| 2010/0186861 A1* | 7/2010 | Ishiguro | B60C 11/0306 152/209.25 |
| 2010/0252159 A1* | 10/2010 | Mukai | B60C 11/0302 152/209.25 |
| 2012/0145295 A1 | 6/2012 | Yamada | |
| 2013/0068360 A1* | 3/2013 | Tamugi | B60C 11/0306 152/209.18 |
| 2013/0167997 A1* | 7/2013 | Hayashi | B60C 11/04 152/209.18 |
| 2013/0192731 A1* | 8/2013 | Oji | B60C 11/0302 152/209.8 |
| 2013/0292021 A1* | 11/2013 | Tanaka | B60C 11/0306 152/209.22 |
| 2016/0089938 A1* | 3/2016 | Iwasaki | B60C 11/0327 152/209.18 |
| 2016/0185160 A1* | 6/2016 | Mukai | B60C 11/0327 152/209.24 |
| 2016/0243900 A1* | 8/2016 | Oji | B60C 11/0306 |
| 2016/0303919 A1* | 10/2016 | Yamaoka | B60C 11/0332 |
| 2017/0015144 A1* | 1/2017 | Ogihara | B60C 11/1307 |

FOREIGN PATENT DOCUMENTS

| | | | |
|---|---|---|---|
| JP | 2001-191736 A | | 7/2001 |
| JP | 2008-120232 A | | 5/2008 |
| JP | 2010-241267 A | | 10/2010 |
| JP | 2011148375 A | * | 8/2011 |
| JP | 2012-126214 A | | 7/2012 |
| JP | 2013-49325 A | | 3/2013 |
| JP | 2013220780 A | * | 10/2013 |
| JP | 2013233822 A | * | 11/2013 ......... B60C 11/0306 |

OTHER PUBLICATIONS

International Search Report, issued in PCT/JP2014/072905, dated Dec. 2, 2014.
Written Opinion of the International Searching Authority, issued in PCT/JP2014/072905(PCT/ISA/237), dated Dec. 2, 2014.

* cited by examiner

PNEUMATIC TIRE

TECHNICAL FIELD

The present invention relates to a pneumatic tire which can achieve both steering stability and snow performance.

BACKGROUND ART

Conventionally, in a tread pattern design of the pneumatic tire, in order to improve the steering stability, by setting a small groove volume of a tread portion and improving rigidity of the tread land portion, a cornering power is improved and a steering response and responsiveness are achieved.

Meanwhile, in a winter tire, a snow column is formed by compacting snow on a road surface in a groove of the tread portion; and owing to a reaction force of shearing it, a driving force on snow and the like is obtained. Thus, in order to increase the snow performance, a groove volume of the winter tire is large. For example, the winter tire has a large the groove volume of a lateral groove extending axially so as to improve traction performance. A technology related to winter tire is as follows.

PRIOR ART DOCUMENTS

Patent Literature

Patent Document 1: Japanese published unexamined application 2008-120232

In the above-mentioned Patent Document 1, a groove width of a lateral groove in an outer groove crossover where the lateral groove intersects with an outer longitudinal main groove is set to larger than a groove width of the lateral groove in an inner groove crossover where the lateral groove intersects with an inner longitudinal main groove.

However, in this kind of the tread pattern, in the vicinity of the outer groove crossover having the larger groove width, since a rigidity of the tread land portion is insufficient, it may be impossible to sufficiently improve the steering stability.

On the other hand, in the winter tire, when reducing the groove volume of the tread portion in order to improve the steering stability, a large snow column is not formed. There is therefore a problem that the snow performance, in particular a running performance with deep snowy road, deteriorates.

SUMMARY OF THE INVENTION

Problems that the Invention is to Solve

The present invention has as a main object to provide the above-described in which consideration has been made on the circumstances, a pneumatic tire which can achieve both the steering stability and the snow performance.

Means for Solving the Problems

According to the present invention, a pneumatic tire is provided in a tread portion with a pair of crown main grooves disposed on both outer sides of the tire equator and extending continuously in the tire circumferential direction, a pair of shoulder main grooves disposed axially outer side of the crown main groove and extending continuously in the tire circumferential direction, a crown land portion disposed between the pair of the crown main grooves, a pair of middle land portions disposed between the crown main groove and the shoulder main groove, and a pair of shoulder land portions located in an axial outer side of the shoulder main groove. The middle land portion is divided into a plurality of middle blocks by a plurality of middle lateral grooves connecting the crown main groove and the shoulder main groove. The middle lateral grooves comprise first middle lateral grooves and second middle lateral grooves disposed alternately in the tire circumferential direction. The first middle lateral grooves comprises a first groove portion communicating with the crown main groove and a second groove portion communicating with the shoulder main groove and having small groove width than the first groove portion. The second middle lateral grooves comprises a third groove portion communicating with the shoulder main groove and a fourth groove portion communicating with the crown main groove and having small groove width than the third groove portion. And the middle land portion is provided in the vicinity of the second groove portion with a first middle slot extending from the shoulder main groove toward the crown main groove and comprising a first end portion terminating inside the middle land portion without communicating with the crown main groove, and in the vicinity of the fourth groove portion with a second middle slot extending from the crown main groove toward the shoulder main groove and comprising a second end portion terminating inside the middle land portion without communicating with the shoulder main groove.

In the pneumatic tire according to the present invention, the middle land portion comprises a first middle sipe extending from the first end portion toward the crown main groove and terminating inside the middle land portion without communicating with the crown main groove, and a second middle sipe extending from the second end portion toward the shoulder main groove and terminating inside the middle land portion without communicating with the shoulder main groove.

In the pneumatic tire according to the present invention, a ratio Ssp1/Wm between an axial length Ssp1 of the first middle sipe and an axial length Wm of the middle land portion is in a range of from 0.38 to 0.58, and a ratio Ssp2/Wm between an axial length Ssp2 of the second middle sipe and the axial length Wm of the middle land portion is in a range of from 0.38 to 0.58.

In the pneumatic tire according to the present invention, an axial length Sst1 of the first middle slot is smaller than an axial length Sm2 of the second groove portion, and an axial length Sst2 of the second middle slot is smaller than an axial length Sm4 of the fourth groove portion.

In the pneumatic tire according to the present invention, the axial length Sst1 of the first middle slot and the axial length Sst2 of the second middle slot is in a range of from 5 to 10 mm, and the axial length Sm4 of the second groove portion and the axial length Sm2 of the axial length Sm4 is in a range of from 11 to 18 mm.

In the pneumatic tire according to the present invention, a groove depth Dm1 of the first groove portion is larger than a groove depth Dm2 of the second groove portion, and a groove depth Dm3 of the third groove portion is larger than a groove depth Dm4 of the fourth groove portion.

In the pneumatic tire according to the present invention, a ratio Dm2/Dm1 between a groove depth Dm1 of the first groove portion and a groove depth Dm2 of the second groove portion is in a range of from 0.5 to 0.9, and a ratio Dm4/Dm3 between a groove depth Dm3 of the third groove portion and a groove depth Dm4 of the fourth groove portion is in a range of from 0.5 to 0.9.

In the pneumatic tire according to the present invention, in the plurality of the middle block, circumferentially longer first middle blocks and circumferentially shorter second middle blocks than the first middle block are arranged alternately.

In the pneumatic tire according to the present invention, a ratio Lm2/Lm1 between a circumferential length Lm1 of the first middle block and a circumferential length Lm2 of the second middle block is in a range of from 0.6 to 0.9.

In the pneumatic tire according to the present invention, the first middle slot, the second middle slot, the first middle sipe, and the second middle sipe are disposed in the first middle block.

In the pneumatic tire according to the present invention, the middle lateral groove comprises a straight groove edge formed in a linear shape, and a stepped groove edge facing to the straight groove edge and comprising the stepped groove edge formed in a stepped shape.

In the pneumatic tire according to the present invention, the first middle block is disposed between the adjacent stepped groove edges, and the second middle block is disposed the adjacent straight groove edges.

Effect of the Invention

A pneumatic tire according to the present invention is provided in a tread portion with a pair of crown main grooves, a pair of shoulder main grooves, a crown land portion, a pair of middle land portions and a pair of shoulder land portions. The middle land portion is divided into a plurality of middle blocks by first middle lateral grooves and second middle lateral grooves disposed alternately in the tire circumferential direction.

The first middle lateral groove comprises a first groove portion communicating with one of the crown main grooves and a second groove portion communicating with the one of the shoulder main groove and having small groove width than the first groove portion. The second middle lateral groove comprises a third groove portion communicating with the shoulder main groove, and a fourth groove portion communicating with the crown main groove and having small groove width than the third groove portion. Thus, the first groove portion and the third groove portion disposed in a diagonal position to the middle block and having a large groove width ensure the groove volume of the middle lateral groove thereby improving the snow performance. Meanwhile, the second groove portion and the fourth groove portion disposed in another diagonal position to the middle block and having small groove width ensure the rigidity of the middle land portion, thereby improving the steering stability.

Additionally, a first middle slot is disposed in the vicinity of the second groove portion, and a second middle slot is disposed in the vicinity of the fourth groove portion; therefore, the groove volumes in the vicinity of the second groove portion and the fourth groove portion having small groove width are well secured. As a result, the snow performance is further enhanced. The first middle slot and the second middle slot having small groove width are provided in the vicinity of the second groove portion and the third groove portion and terminate inside the middle land portion. Therefore, the rigidity distribution of the middle land portion is made uniform, and steering stability and wear resistance can be obtained excellently.

EMBODIMENTS OF THE INVENTION

Hereinafter, one embodiment of the present invention will be described with reference to the drawings.

Figure 1:
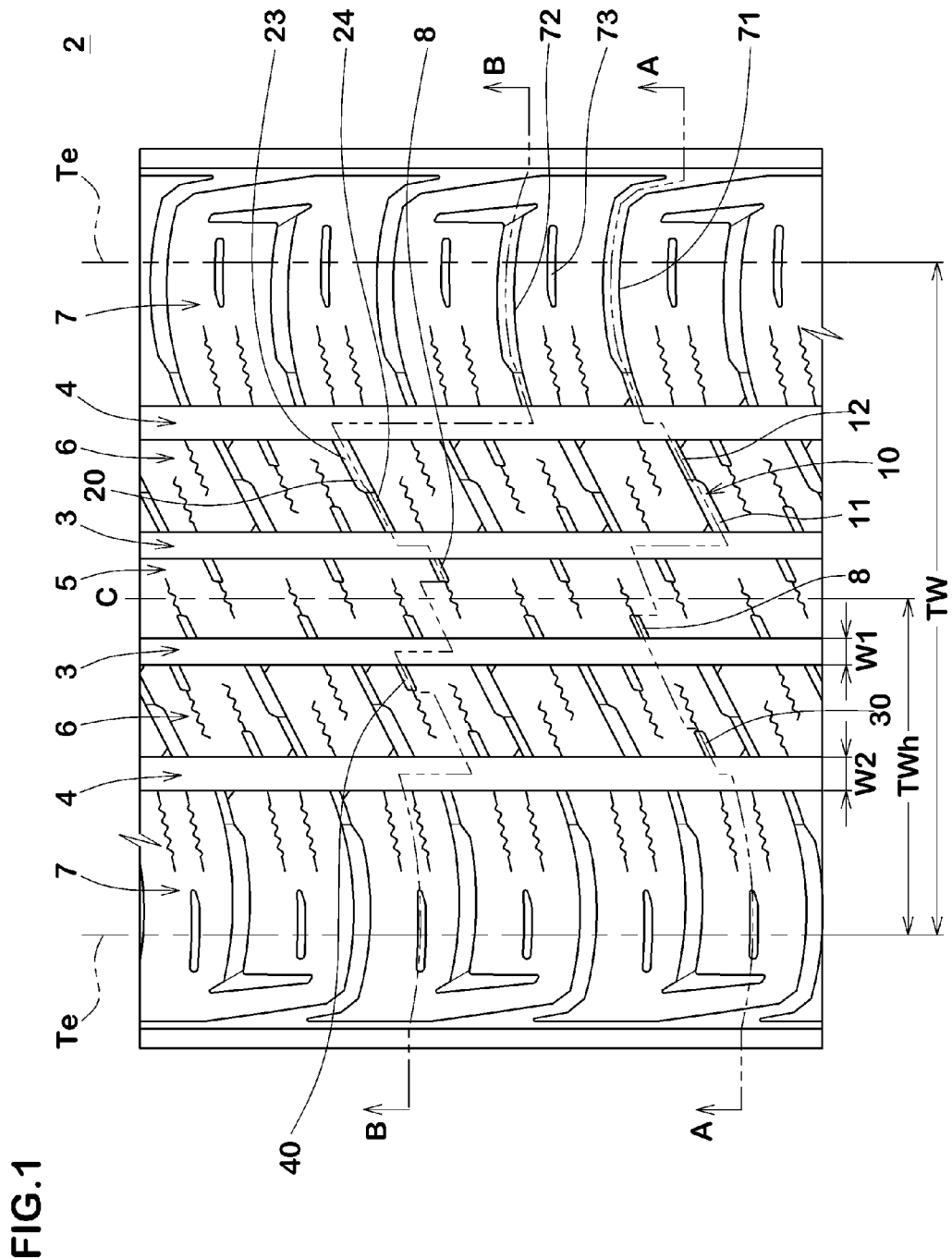
FIG. 1 is a development view of a tread portion showing an embodiment of a pneumatic tire of the present invention.

FIG. 1 shows a development view of a tread portion 2 of a pneumatic ti re (overall view not shown) of the present embodiment. As shown in FIG. 1, the pneumatic tire is provided in a tread portion 2 with a pair of crown main grooves 3 disposed on both sides of the tire equator C and extending continuously in the tire circumferential direction, and a pair of shoulder main grooves 4 disposed axially outer side of the crown main grooves 3 and extending continuously in the tire circumferential direction.

By the crown main grooves 3 and the shoulder main grooves 4, the tread portion 2 is divided into a plurality of regions. In other words, the tread portion 2 comprises a crown land portion 5 disposed between the pair of crown main grooves 3 and 3, a pair of middle land portion 6 disposed between the crown main groove 3 and the shoulder main groove 4, and a pair of shoulder land portions 7 located axially outside of the shoulder main groove 4.

A land ratio defined by respective grooves and respective land portions is preferably not less than 64%, more preferably not less than 66%, and preferably not more than 72%, more preferably not more than 70%. As a result, a good balance can be achieved between dry performance and wet performance. Meanwhile, the "land ratio" means, between the tread ground contact edge Te and Te, a ratio of an actual ground area to the total area of a virtual contact area obtained by filling all the grooves.

The tread ground contact edge Te means the most axially outward of the ground end when the tire under a normal state with a normal load and grounding at an camber angle 0 degree on a plane surface. Here, the normal state means that a state that the tire mounted on a normal rim (not shown) inflated to a normal pressure and loaded with no-load. In this description, unless otherwise noted, each dimension of portions of the tire including the above-mentioned dimensions is measured under the normal state.

The "normal rim" is a rim determined for each tire by a standard including one on which the tire is based. For example, it is a standard rim in the case of JATMA, a "Design Rim" in the case of TRA, and a "Measuring Rim" in the case of ETRTO.

The "normal internal pressure" means an air pressure determined for each tire by the standard. For example, it is the maximum air pressure in JATMA, the maximum value described in a table "TIRE LOAD LIMITS AT VARIOUS COLD INFLATION PRESSURES" in the case of TRA, and the "INFLATION PRESSURE" in the case of ETRTO.

The "normal load" is a load determined for each tire by the standard. For example, it is the maximum load ability in the case of JATMA, the maximum value described in a Table "TIRE LOAD LIMITS AT VARIOUS COLD INFLATION PRESSURES" in the case of TRA, and the "LOAD CAPACITY" in the case of ETRTO. When the tire is for a passenger car, the normal load is a load equivalent to 88% of the above-mentioned load.

The crown main groove 3, for example, extends linearly and continuously in the tire circumferential direction and discharges water produced in the vicinity of the tire equator C during a wet running. The shape of the crown main groove 3 is not limited to this and may extend in a zigzag shape or an S-shape.

The shoulder main groove 4, similarly to the crown main groove 3, extends continuously in a linear fashion in the tire circumferential direction but may extend in a zigzag shape or an S-shape.

Groove widths w1 and W2 of the crown main groove 3 and the shoulder main groove 4 (Each of the groove widths is defined as a width perpendicular to the longitudinal direction of the groove; following the same applies to other grooves.) are defined variously in accordance with convention. However, if the groove widths w1 and W2 are too large, the rigidity of each of the crown land portion 5, the middle land portion 6 and the shoulder land portion 7 decreases, and it may be impossible to improve the steering stability. Meanwhile, if the groove widths W1 and W2 are too small, it may be impossible to deteriorate the drainage performance and snow disposal performance. Further, in this case, since a large snow column cannot be formed, it may be impossible to improve the snow performance. Therefore, the groove width W1 is, for example, is preferably in a range of from 2% to 6% of the grounding width TW. Also, the groove width W2, for example, is preferably in a range of from 3% to 7% of the grounding width TW.

Figure 2A:
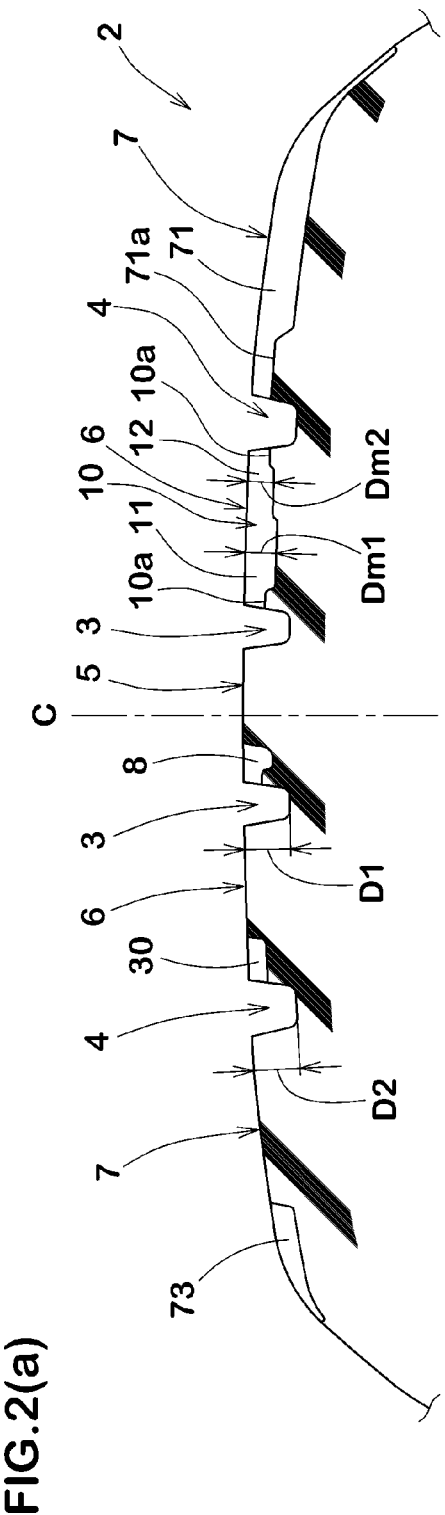
FIG. 2 is a cross-sectional view of the tread portion of FIG. 1.
Figure 2B:
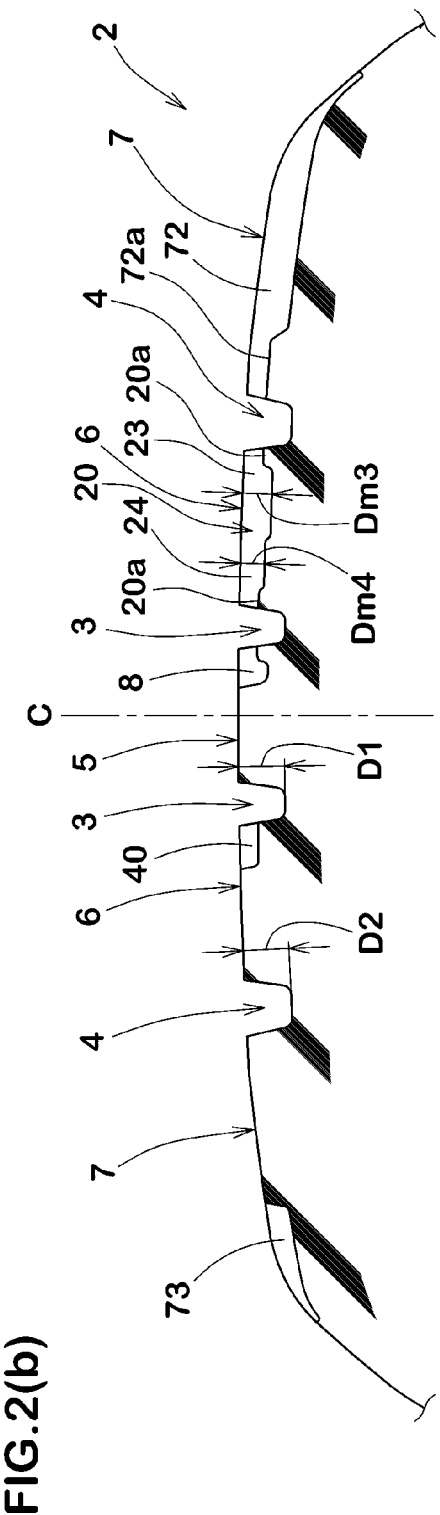

FIG. 2 (a) is a cross-sectional view taken on line A-A of FIG. 1, and FIG. 2 (b) is a cross-sectional view taken on line B-B of FIG. 1, respectively. Also groove depths D1 and D2 of the crown main groove 3 and the shoulder main groove 4 can be determined as well as the groove widths W1 and W2. If the groove depths D1 and D2 are too large, the rigidity of each of the crown land portion 5, the middle land portion 6, and the shoulder land portion 7 decreases, it may be impossible to improve the steering stability. Meanwhile, if the groove depths D1 and D2 are too small, the drainage performance and the snow disposal performance may decrease, and because of luck of forming a large snow column, it may be impossible to improve the snow performance. Therefore, the groove depths D1 and D2, as in the present embodiment, in the case of a passenger car tires, is preferably in a range of from 7.5 to 10 mm.

Figure 3:
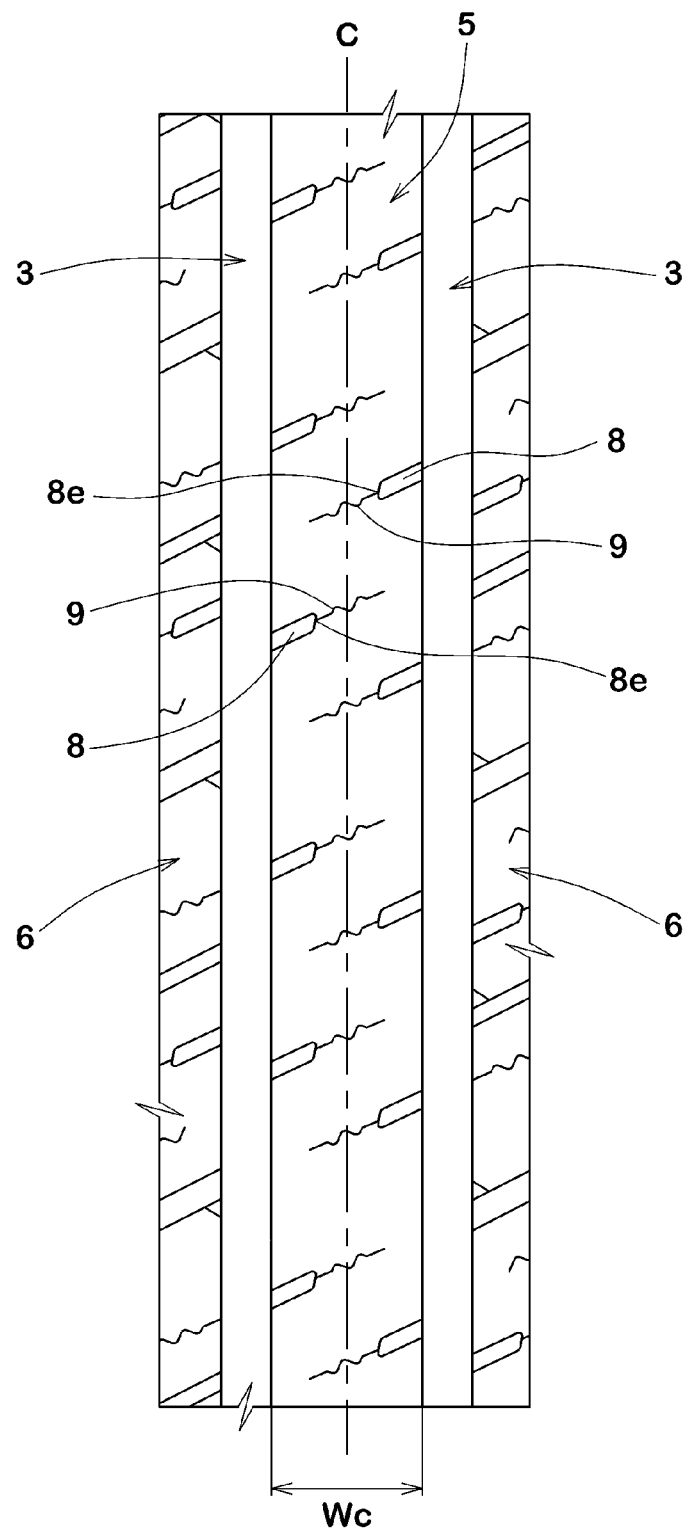
FIG. 3 is an enlarged development view of a crown land portion of FIG. 1.

FIG. 3 shows an enlarged development view of the crown land portion 5. When an axial width Wc of the crown land portion 5 is small, the dry performance and the wear resistance possibly deteriorate, and when it is large, the wet performance possibly deteriorates. From this viewpoint, the width Wc is preferably not less than 20% of the tread half width Twh, more preferably not less than 22%, and preferably not more than 28%, more preferably not more than 26%.

The crown land portion 5 comprises a crown slot 8 and a crown sipes 9. The crown slot 8 extends from the crown main groove 3 toward the tire equator C. The direction of extension of the crown slot 8 inclines with respect to the tire axial direction. The crown slot 8 comprises an end portion 8e terminating without reaching the tire equator C in the crown land portion 5. This kind of crown slot 8 can improve the drainage performance and the snow disposal performance of the crown main groove 9 and can improve the wet performance and the snow performance.

The crown sipes 9 extends at an angle from the end portion 8e of the crown slot 8 toward the tire equator C and terminates inside the crown land portion 5 across the tire equator C. The crown sipes 9 is formed in a wavelike or zigzag shape. This kind of crown Sipe 9 is good for an effective edge effect and improves the grip on an icy road.

In this embodiment, since the crown slot 8 and the crown sipes 9 terminate without axially penetrating into the crown land portion 5, the crown land portion 5 is formed in a rib shape continuing circumferentially. Therefore, the rigidity of the crown land portion 5 is sufficiently ensured, and the steering stability and wear resistance can be obtained excellently.

Figure 4:
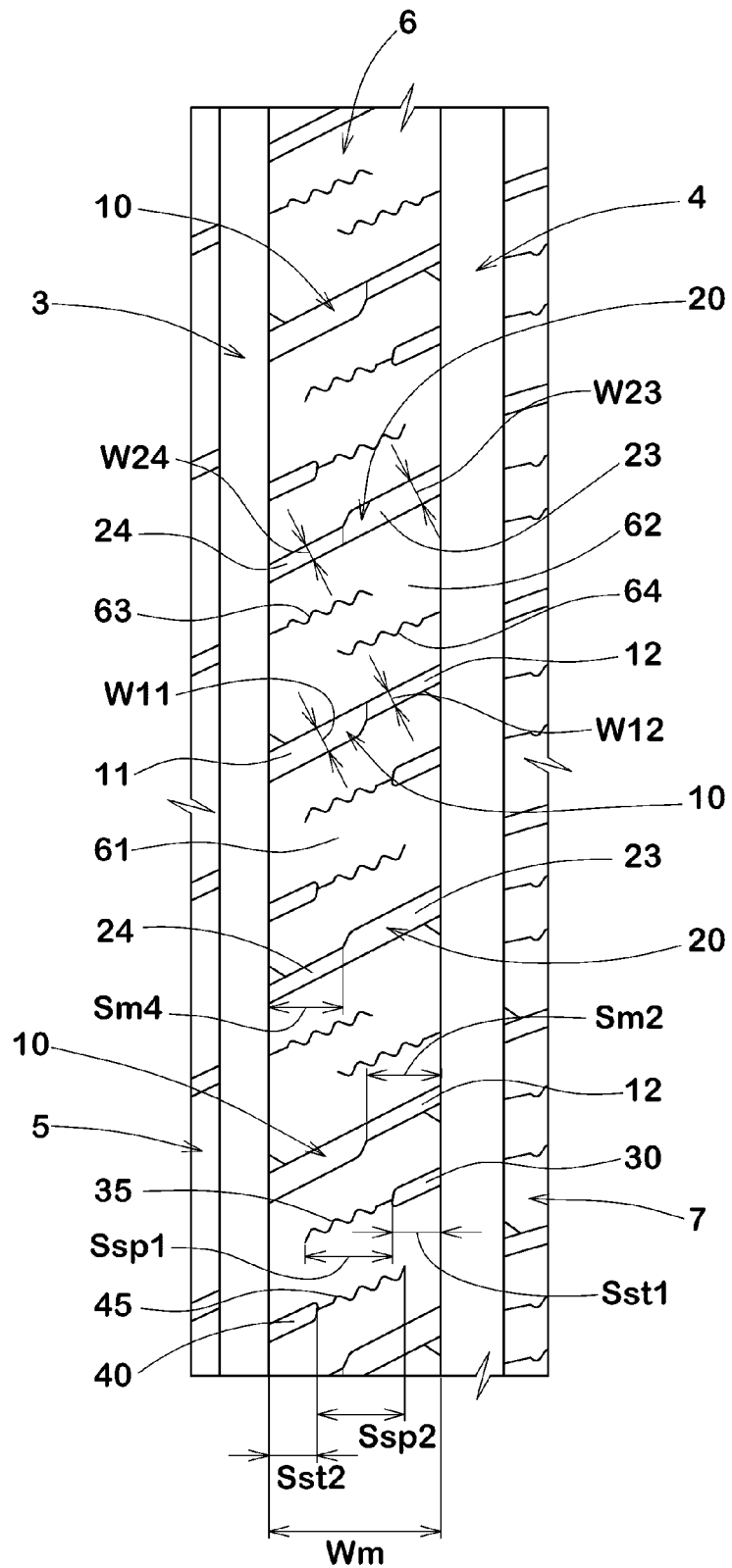
FIG. 4 is an enlarged development view of a middle land portion of FIG. 1.

FIG. 4 shows an enlarged development view of the middle land portion 6. A width Wm of the middle land portion 6 is preferably larger than the width We of the crown land portion 5 (see FIG. 3). Accordingly, each of ground contact pressures of the crown land portion 5 and the middle land portion 6 is optimized, and uneven wear is prevented. When the width Wm of the middle land portion 6 is small, the dry performance possibly deteriorates, also the wear resistance possibly deteriorates. When the width Wm of the middle land portion 6 is large, the wet performance possibly deteriorates. From this viewpoint, the width Wm of the middle land portion 6 is preferably not less than 24%, more preferably not less than 26%, and preferably not more than 32%, more preferably not more than 30% of the tread half width Twh. For passenger car tire according to the present embodiment, the width Wm of the middle land portion 6 is preferably in a range of from 20 to 30 mm.

The middle land portion 6 comprises a plurality of first middle lateral grooves 10, second middle lateral grooves 20, first middle slots 30, and second middle slots 40. Each of the first middle lateral grooves 10, the second middle lateral grooves 20, the first middle slots 30, and the second middle slots 40 extends in the same direction as the crown slot 8 with respect to the tire axial direction.

The first middle lateral groove 10 and the second middle lateral groove 20 are formed by connecting between the crown main groove 3 and the shoulder main groove 4. That is, the first middle lateral groove 10 and the second middle lateral groove 20 are formed in communication with the crown main groove 3 and the shoulder main groove 4. The first middle lateral groove 10 and the second middle lateral groove 20 are disposed alternately in the tire circumferential direction. The first middle lateral groove 10 and the second middle lateral groove 20 divide the middle land portion 6 into a first middle block 61 and a second middle block 62. An interval between the first middle lateral groove 10 and the second middle lateral groove 20 is not constant in the tire circumferential direction, and the first middle block 61 has a circumferentially larger length than the second middle block 62.

The first middle lateral groove 10 comprises a first groove portion 11 communicating with the crown main groove 3, and a second groove portion 12 communicating with the shoulder main groove 4. A groove width W12 of the second groove portion 12 is smaller than a groove width W11 of the first groove portion 11. That is, a groove space of the second groove portion 12 is narrower than a groove space of the first groove portion 11. The first groove portion 11 and the second groove portion 12 are communicated with each other at the center of the tire axial direction of the middle land portion 6.

The second middle lateral groove 20 comprises a third groove portion 23 communicating with the shoulder main groove 4, and a fourth groove portion 24 communicating with the crown main groove 3. A groove width W23 of the third groove portion 23 is equivalent to the groove width W11. A groove width W24 of the fourth groove portion 24 is equivalent to the groove width E12 and smaller than the groove width W23 of the third groove portion 23. That is, a groove space of the fourth groove portion 24 is narrower than the groove space of the third groove portion 23. The third groove portion 23 and the fourth groove portion 24 are communicated with each other at the center of the tire axial direction of the middle land portion 6.

Figure 5:
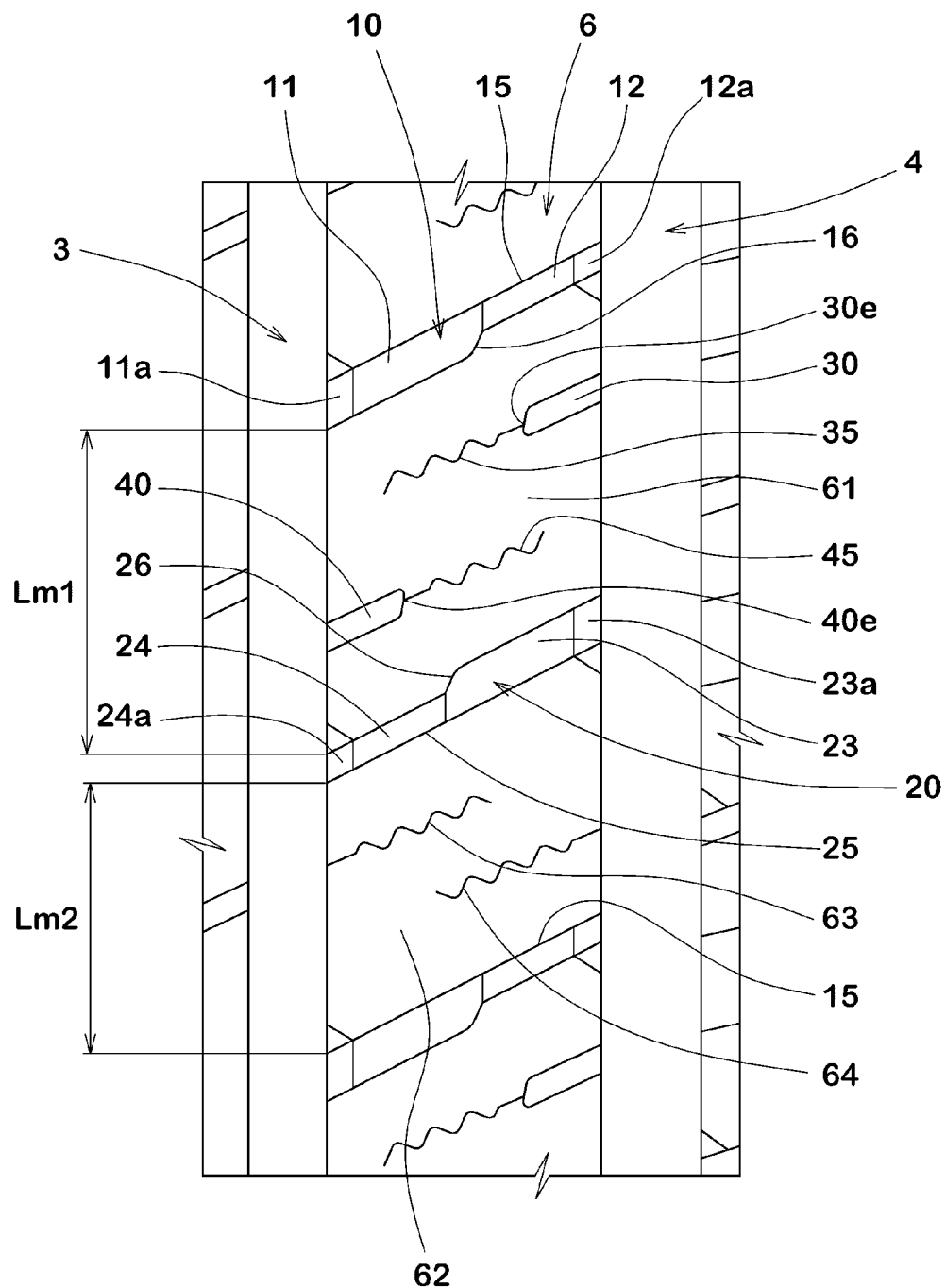
FIG. 5 is an enlarged development view of a first middle block and a second middle block of FIG. 4.

FIG. 5 shows an enlarged view of the first middle block 61 and the second middle blocks 62 which are adjacent. A circumferential length Lm1 of the first middle block 61 is larger than a circumferential length Lm2 of the second middle block 62.

In the first middle block 61, the first groove portion 11 of the first middle lateral groove 10 and the third groove portion 23 of the second middle lateral groove 20 are provided in a diagonal position to the first middle block 61. These kinds of first groove portion 11 and the third groove portion 23 arranged diagonally and having a large groove width contribute to securing the groove volume of the middle lateral grooves 10 and 20 and to improve the snow performance.

On the other hand, the second groove portion 12 of the first middle lateral groove 10 and the fourth groove portion 24 of the second middle lateral groove 20 are provided in another diagonal position to the first middle block 61. This kind of the second groove portion 12 and the fourth groove portion 24 disposed the other diagonal and having small groove width contributes to ensuring the rigidity of the middle land portion 6 and improves the steering stability.

In the present embodiment, on the side of the crown main groove 3, the first groove portion 11 having large groove width and the fourth groove portion 24 having small groove width are arranged alternately. Also on the shoulder main groove 4, the second groove portion 12 having small groove width and the third groove portion 23 having large groove width are arranged alternately.

Thus, on either side of the main groove, since the groove portion 11 and groove portion 24 having larger groove width are not continuously disposed, the rigidity of the middle land portion 6 is sufficiently ensured, and the steering stability and the wear resistance can be obtained excellently. Furthermore, on either side of the main groove, the groove portion 12 and groove portion 23 having small groove width are not continuously disposed, the drainage performance and the snow disposal performance of the middle land portion 6 are sufficiently secured, and the wet performance and the snow performance are improved. Furthermore, on either side of the main groove, since a large snow column and a small snow column are alternately formed, the driving force caused by snow column shear is obtained stably throughout the tread of the middle land portion 6.

The first middle slot 30 is provided in the vicinity of the second groove portion 12, and the second middle slot 40 is provided in the vicinity of the fourth groove portion 24. The second groove portion 12 and the fourth groove portion 24 are provided diagonally in the first middle block 61; therefore the first middle slot 30 and the second middle slot 40 are also provided diagonally in the first middle block 61.

In this embodiment, since the first middle block 61 having a circumferentially longer length is provided with the first middle slot 30 and the second middle slot 40, the rigidity distribution of the middle land portion 6 is uniformized and the steering stability and wear resistance can be excellently obtained. In addition, the drainage performance and snow disposal performance of the middle land portion 6 is sufficiently secured, and the wet performance and the snow performance are improved.

The first middle slot 30 extends from the shoulder main groove 4 toward the crown main groove 3. The first middle slot 30 comprises a first end portion 30e terminating inside the middle land portion 6 without communicating with the crown main groove 3.

The second middle slot 40 extends from the crown main groove 3 toward the shoulder main groove 4. The second middle slot 40 comprises a second end portion 40e terminating inside the middle land portion 6 without communicating with the shoulder main groove 4.

Thus, the first middle slot 30 and the second middle slot 40 are provided in the vicinity of the second groove portion 12 and fourth groove portion 24 having small groove width, and terminate inside the middle 1 and portion 6; therefore, the rigidity distribution of the middle land portion 6 is uniformized, and the steering stability and the wear resistance can be excellently obtained. Furthermore, this kind of the first middle slot 30 and the second middle slot 40 makes up for the drainage performance and the snow disposal performance and the like of the second groove portion 12 and the fourth groove portion 24 and improves the wet performance and the snow performance.

In this embodiment, a ratio Lm2/Lm1 between a circumferential length Lm1 of the first middle block 61 and a circumferential length Lm2 of the second middle block 62 is preferably in a range of from 0.6 to 0.9.

If the ratio Lm2/Lm1 is less than 0.6, the rigidity of the second middle block 62 is insufficient; and it may be impossible to improve the steering stability and the wear resistance. However, if the ratio Lm2/Lm1 exceeds 0.9, distances between the first middle lateral groove 10, the second middle lateral groove 20, the first middle slot 30, and the second middle slot 40 are widened; therefore the wet performance and the snow performance may not be able to increase sufficiently.

The middle land portion 6 is provided with a first middle sipe 35, a second middle sipe 45, a third middle sipe 63 and a fourth middle sipe 64. The first middle sipe 35 and the second middle sipe 45 are formed in the first middle block 61. The third middle sipe 63 and the fourth middle sipe 64 are formed in the second middle block 62.

The first middle sipe 35 extends from the first end portion 30e of the first middle slot 30 toward the crown main groove 3 and terminates inside the middle land portion 6 without communicating with the crown main groove 3. The second middle sipe 45 extending from the second end portion 40e of the second middle slot 40 toward the shoulder main groove 4 and terminates inside the middle land portion 6 without communicating with the shoulder main groove 4. The first middle sipe 35 and the second middle sipe 45 are formed in a wavelike or zigzag shape.

These kinds of the first middle sipe 35 and the second middle sipe 45 uniformize the rigidity of the first middle block 61 and improve the steering stability and the wear resistance; and the edge effect is effectively generated, thereby improving the grip on the icy road.

In FIG. 4, a ratio Ssp1/Wm between an axial length Ssp1 of the first middle sipe 35 and an axial length Wm of the middle land portion 6 is preferably in a range of from 0.38 to 0.58. Similarly, a ratio Ssp2/Wm between an axial length Ssp2 of the second middle sipe 45 and the axial length Wm is preferably in a range of from 0.38 to 0.58.

If the ratio Ssp1/Wm and the ratio Ssp2/Wm are less than 0.38, the edge effect of the first middle sipe 35 cannot be sufficiently obtained, and there is a possibility that the grip on the icy road cannot be increased enough. However, if the ratio Ssp1/Wm and the ratio Ssp2/Wm exceed 0.58, the rigidity of the first middle block 61 is insufficient, and it may be impossible to sufficiently increase the steering stability and the wear resistance.

The third middle sipe 63 extends from the crown main groove 3 toward the shoulder main groove 4 and terminates inside the middle land portion 6 without communicating with the shoulder main groove 4. The fourth middle sipe 64 extends from shoulder main groove 4 toward the crown main groove 3 and terminates inside the middle land portion 6 without communicating with the crown main groove 3. The third middle sipe 63 and the fourth middle sipe 64 are formed in a wavelike or zigzag shape.

These kinds of the third middle sipe 63 and the fourth middle sipe 64 uniformize the rigidity of the second middle block 62 and improves the steering stability and the wear resistance; and also the edge effect is effectively generated thereby improving the grip on the icy road.

Furthermore, in FIG. 4, an axial length Sst1 of the first middle slot 30 is preferably smaller than an axial length Sm2 of the second groove portion 12. Similarly, an axial length Sst2 of the second middle slot 40 is preferably smaller than an axial length Sm4 of the fourth groove portion 24.

The axial length Sst1 of the first middle slot 30 and the axial length Sst2 of the second middle slot 40 is more preferably in a range of from 5 to 10 mm.

If the axial length Sst1 of the first middle slot 30 and the axial length Sst2 of the second middle slot 40 is less than 5 mm, the drainage performance and the snow disposal performance of the first middle slot 30 and the second middle slot 40 are not sufficiently exhibited, and there is a possibility that the wet performance and the snow performance cannot be sufficiently improved.

If the axial length Sst1 of the first middle slot 30 and the axial length Sst2 of the second middle slot 40 exceed 10 mm, the rigidity of the first middle block 61 is insufficient; and there is a possibility that the steering stability and the wear resistance are not sufficiently improved.

However, the axial length Sm2 of the second groove portion 12 and the axial length Sm4 of the fourth groove portion 24 is more preferably in a range of from 11 to 18 mm.

If the axial length Sm2 of the second groove portion 12 and the axial length Sm4 of the fourth groove portion 24 are less than 11 mm, the drainage performance and the snow disposal performance of the second groove portion 12 are not sufficiently exhibited, and there is a possibility that the wet performance and the snow performance are not sufficiently improved.

If the axial length Sm2 of the second groove portion 12 and the axial length Sm4 of the fourth groove portion 24 exceeds 18 mm, the rigidity of first middle block 61 is insufficient, and there is a possibility that the steering stability and the wear resistance can not be improved.

In FIG. 2 (*a*), a groove depth Dm1 of the first groove portion 11 is preferably larger than a groove depth Dm2 of the second groove portion 12. Similarly, in FIG. 2 (*b*), a groove depth Dm3 of the third groove portion 23 is preferably larger than a groove depth Dm4 of the fourth groove portion 24.

A ratio Dm2/Dm1 between the groove depth Dm1 of the first groove portion 11 and the groove depth Dm2 of the second groove portion 12 is more preferably in a range of from 0.5 to 0.9. Similarly, a ratio Dm4/Dm3 between the groove depth Dm3 of the third groove portion 23 and the groove depth Dm4 of the fourth groove portion 24 is in a range of from 0.5 to 0.9.

If the ratio Dm2/Dm1 and the ratio Dm4/Dm3 are less than 0.5, the rigidity of the middle land portion 6 in the vicinity of the first groove portion 11 and the fourth groove portion 24 is insufficient, and there is a possibility that the steering stability and the wear resistance can not be sufficiently improved. In this case, the drainage performance and the snow disposal performance of the second groove portion 12 and the third groove portion 23 are not sufficiently exhibited, and there is a possibility that the wet performance and the snow performance can not be sufficiently improved.

If the ratio Dm2/Dm1 and the ratio Dm4/Dm3 exceed 0.9, the drainage performance and the snow disposal performance of the first groove portion 11 and the fourth groove portion 24 are not sufficiently exhibited, there is a possibility that the wet performance and the snow performance can not be sufficiently improved. In this case, the rigidity of the middle land portion 6 in the vicinity of the second groove portion 12 and the third groove portion 23 is insufficient, and there is a possibility that the steering stability and the wear resistance can not be sufficiently improved.

As shown also in FIG. 2 (*a*), in an end edge portion of the crown main groove 3 side of the first middle lateral groove 10 and an end edge portion of the shoulder main groove 4 side, tie bar-shaped raised portions 10*a* raised from a groove bottom are formed respectively. Owing to the raised portions 10*a*, the adjacent first middle block 61 and second middle block 62 are connected at the end edges of the first middle lateral groove 10, thereby improving the rigidity of the middle land portion 6. Similarly, also as shown in FIG. 2 (*b*), in the end edge portion of the second middle lateral groove 20, tie bar-shaped raised portions 20*a* raised from the groove bottom are formed respectively. Owing to the raised portions 20*a*, the adjacent first middle block 61 and the second middle block 62 are connected at the end edges of the second middle lateral groove 20, thereby improving the rigidity of the middle 1 and portion 6. The raised portions 10*a* are formed of a raised portion 11*a* on the crown main groove 3 side and a raised portion 12*a* on the shoulder main groove 4 side (see FIG. 5). Similarly, the raised portions 20*a* are formed of a raised portion 23*a* on the shoulder main groove 4 side and a raised portion 24*a* on the crown main groove 3 side.

As shown in FIG. 5, the first middle lateral groove 10 comprises a straight groove edge 15 formed in a straight line and a stepped groove edge 16 disposed diagonally to the straight groove edge 15 and formed in a step-like fashion. Owing to the straight groove edge 15 and the stepped groove edge 16, a first groove portion 11 having large groove width and a second groove portion 12 having small groove width are formed.

The second middle lateral groove 20 comprises a straight groove edge 25 formed in a straight line and a stepped groove edge 26 disposed diagonally to the straight groove edge 25 and formed in a step-like fashion. Owing to the straight groove edge 25 and the stepped groove edge 26, a third groove portion 23 having a lager groove width and a fourth groove portion 24 having small groove width are formed.

The first middle block 61 is disposed in a position between the adjacent stepped groove edges 16 and 26.

Therefore, the first middle slot 30 and the first middle sipe 35 are provided in the vicinity of the stepped groove edge 16. Similarly, the second middle slot 40 and the second middle sipe 45 are provided in the vicinity of the stepped groove edge 26.

The second middle block 62 is disposed in a position between the adjacent straight groove edges 15 and 25. Therefore, the third middle sipe 63 is provided in the vicinity of the straight groove edge 25. Similarly, the fourth middle sipe 64 is provided in the vicinity of the straight groove edge 15.

Figure 6:
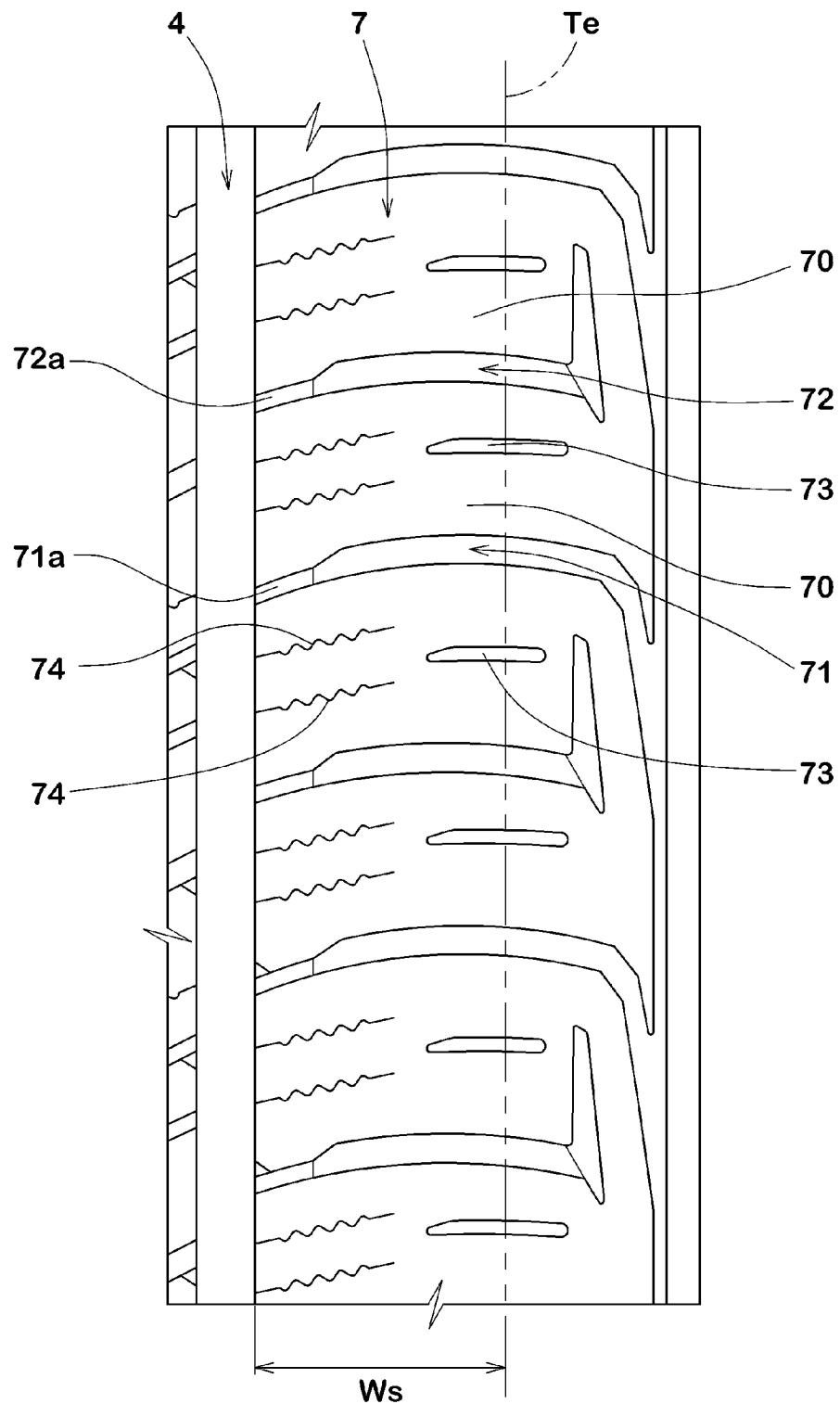
FIG. 6 is an enlarged development view of a shoulder land portion of FIG. 1.

FIG. 6 shows an enlarged development view of the shoulder land portion 7. A width Ws of the shoulder land portion 7 is preferably formed larger than a width Wm of the middle land portion 6. Accordingly, the ground contact pressure of middle land portion 6 and the shoulder land portion 7 is optimized, and uneven wear is prevented. If the width Ws of the shoulder land portion 7 is small, there is a possibility that the steering stability and the wear resistance deteriorate. If the width Ws of the shoulder land portion 7 is large, there is a possibility that the wet performance deteriorates. From these viewpoints, the width Ws of the shoulder land portion 7 is preferably not less than 44%, more preferably not less than 46%, and preferably not more than 52%, more preferably not more than 50% of the tread half width Twh.

The shoulder land portion 7 comprises a first shoulder lateral groove 71, a second shoulder lateral groove 72, a shoulder lateral groove 73, and a shoulder sipe 74. The first shoulder lateral groove 71 and the second shoulder lateral groove 72 divides the shoulder land portion 7 into a plurality of shoulder blocks 70.

The first shoulder lateral groove 71 extends axially inwardly at least from the tread ground contact edge Te and communicates with the shoulder main groove 4. Axial outward end edges of the adjacent first shoulder lateral grooves 71 communicate in the axially outward of the second shoulder lateral groove 72 and the shoulder lateral groove 73.

The second shoulder lateral groove 72 extends axially inward at least from the tread ground contact edge Te and communicates with the shoulder main groove 4.

Also shown in FIGS. 2 (a) and (b), in the end edge portions on the shoulder main groove 4 side of the first shoulder lateral groove 71 and the second shoulder lateral groove 72, tie bar-shaped raised portions 71a and 72a raised from the groove bottom are formed. Owing to the raised portions 71a and 72a, the adjacent shoulder blocks 70 are connected one another in the end edges of the first shoulder lateral groove 71 and the second shoulder lateral groove 72, thereby improving the rigidity of the shoulder land portion 7.

The shoulder lateral groove 73 extends axially inward at least form the tread ground contact edge Te and terminates without communicating with the shoulder main groove 4.

The first shoulder lateral groove 71, the second shoulder lateral groove 72, and the shoulder lateral groove 73 contribute to improving the drainage performance and the snow disposal performance of the shoulder land portion 7, and the wet performance and the snow performance are improved. Furthermore, the first shoulder lateral groove 71, the second shoulder lateral groove 72 and the shoulder lateral groove 73 shear the snow column formed in the tread of the shoulder land portion 7, thereby improving the traction performance.

The shoulder sipe 74 extends axially outward from the shoulder main groove 4 and terminates without connecting with the tread ground contact edge Te. The shoulder sipes 74 are provided in pairs in each shoulder blocks 70. The respective shoulder sipes 74 are provided on both sides in the tire circumferential direction of the shoulder lateral groove 73 in a wavelike or zigzag shape.

This kind of the shoulder sipe 74 uniformizes the rigidity of the shoulder blocks 70 and improves the steering stability and the wear resistance, also generate the edge effect effectively and improve the grip on the icy road.

According to the pneumatic tire of the present embodiment having the construction described above, owing to the first groove portion 11 and the third groove portion 23 disposed in a diagonal portion to the first middle block 61 and having a large groove width, the groove volume of the first middle lateral groove 10 is secured, and the snow performance is improved. On the other hand, owing to the second groove portion 12 and the fourth groove portion 24 disposed in another diagonal position to the first groove portion 11 and the third groove portion 23 of the first middle block 61 and having small groove width, the rigidity of the middle land portion 6 is secured, and the steering stability is improved.

Furthermore, the first middle slot 30 is provided in the vicinity of the second groove portion 12, and the second middle slot 40 is provided in the vicinity of the fourth groove portion 24, therefore the groove volume in the vicinity of the second groove portion 12 and the fourth groove portion 24 having small groove width is sufficiently secured. As a result, the snow performance is more improved. The first middle slot 30 and the second middle slot 40 are provided in the vicinity of the second groove portion 12 and the third groove portion 23 having small groove width and terminates inside the middle land portion 6, therefore the rigidity distribution of the middle land portion 6 is uniformized and the steering stability and the wear resistance are excellently obtained.

Above, the pneumatic tire of the present invention have been described in detail, the invention is implemented by changing the various aspects without being limited to the specific embodiments described above.

Example

A pneumatic tire of size 245/50R20 having a tread pattern shown in FIG. 1 was prototyped based on specifications shown in Tables 1 and 2. Steering stability and snow running performance were tested. Testing methods were as follows.

<Steering Stability>

The test tires each mounted on a rim 20×7.5 J were attached to the all wheels of a 3700-cc passenger car under a condition of internal pressure of 250 kPa. The car was traveled at a speed range of 80 to 120 km/h on a test course of a dry asphalt road with a single driver. Response of steering and answering property were evaluated by the driver's feeling. The results are displayed using a score for the Comparative Example 1 being 100. The larger the numeric values are, the more favorable the steering stability is.

<Snow Performance>

The above-mentioned car was brought into a snowy road, and eases of starting, acceleration and braking were evaluated by the driver's feeling. The results are di splayed using a score for the comparative Example 1 being 100. The larger the numeric values are, the more favorable the snow performance is.

TABLE 1

|  | Com. Ex. 1 | Ex. 1 | Ex. 2 | Ex. 3 | Ex. 4 |
|---|---|---|---|---|---|
| First groove portion, Second groove portion | None | Present | Present | Present | Present |
| First groove portion, Second groove portion | None | Present | Present | Present | Present |
| First middle slot | None | Present | Present | Present | Present |
| Second middle slot | None | Present | Present | Present | Present |
| First middle sipe | None | None | Present | Present | Present |
| Second middle sipe | None | None | None | Present | Present |
| Sm2, Sm4 [mm] | 0 | 14.0 | 14.0 | 10.0 | 11.0 |
| Sst1, Sst2 [mm] | 0 | 8.0 | 8.0 | 8.0 | 8.0 |
| Dm2/Dm1, Dm4/Dm3 | 1 | 0.8 | 0.8 | 0.8 | 0.8 |
| Lm2/Lm1 | 1 | 0.8 | 0.8 | 0.8 | 0.8 |
| Steering stability (score) | 100 | 115 | 120 | 130 | 125 |
| Snow performance (score) | 100 | 115 | 120 | 100 | 110 |

|  | Ex. 5 | Ex. 6 | Ex. 7 | Ex. 8 | Ex. 9 |
|---|---|---|---|---|---|
| First groove portion, Second groove portion | Present | Present | Present | Present | Present |
| First groove portion, Second groove portion | Present | Present | Present | Present | Present |
| First middle slot | Present | Present | Present | Present | Present |
| Second middle slot | Present | Present | Present | Present | Present |
| First middle sipe | Present | Present | Present | Present | Present |
| Second middle sipe | Present | Present | Present | Present | Present |
| Sm2, Sm4 [mm] | 18.0 | 19.0 | 14.0 | 14.0 | 14.0 |
| Sst1, Sst2 [mm] | 8.0 | 8.0 | 4.0 | 5.0 | 10.0 |
| Dm2/Dm1, Dm4/Dm3 | 0.8 | 0.8 | 0.8 | 0.8 | 0.8 |
| Lm2/Lm1 | 0.8 | 0.8 | 0.8 | 0.8 | 0.8 |
| Steering stability (score) | 110 | 100 | 130 | 125 | 110 |
| Snow performance (score) | 125 | 130 | 100 | 110 | 125 |

|  | Ex. 10 | Ex. 11 | Ex. 12 | Ex. 13 | Ex. 14 |
|---|---|---|---|---|---|
| First groove portion, Second groove portion | Present | Present | Present | Present | Present |
| First groove portion, Second groove portion | Present | Present | Present | Present | Present |
| First middle slot | Present | Present | Present | Present | Present |
| Second middle slot | Present | Present | Present | Present | Present |
| First middle sipe | Present | Present | Present | Present | Present |
| Second middle sipe | Present | Present | Present | Present | Present |
| Sm2, Sm4 [mm] | 14.0 | 14.0 | 14.0 | 14.0 | 14.0 |
| Sst1, Sst2 [mm] | 11.0 | 8.0 | 8.0 | 8.0 | 8.0 |
| Dm2/Dm1, Dm4/Dm3 | 0.8 | 0.4 | 0.5 | 0.9 | 1.0 |
| Lm2/Lm1 | 0.8 | 0.8 | 0.8 | 0.8 | 0.8 |
| Steering stability (score) | 100 | 110 | 115 | 115 | 110 |
| Snow performance (score) | 130 | 110 | 115 | 115 | 110 |

TABLE 2

|  | Ex. 15 | Ex. 16 | Ex. 17 | Ex. 18 |
|---|---|---|---|---|
| First groove portion, Second groove portion | Present | Present | Present | Present |
| First groove portion, Second groove portion | Present | Present | Present | Present |
| First middle slot | Present | Present | Present | Present |
| Second middle slot | Present | Present | Present | Present |
| First middle sipe | Present | Present | Present | Present |
| Second middle sipe | Present | Present | Present | Present |
| Sm2, Sm4 [mm] | 14.0 | 14.0 | 14.0 | 14.0 |
| Sst1, Sst2 [mm] | 8.0 | 8.0 | 8.0 | 8.0 |
| Dm2/Dm1, Dm4/Dm3 | 0.8 | 0.8 | 0.8 | 0.8 |
| Lm2/Lm1 | 0.5 | 0.6 | 0.9 | 1.0 |
| Steering stability (score) | 110 | 115 | 120 | 115 |
| Snow performance (score) | 115 | 120 | 115 | 110 |

As is apparent from Tables 1 and 2, the pneumatic tires of Examples were improved significantly in the steering stability and the snow performance compared to the Comparative Example.

DESCRIPTION OF THE CODE

2 Tread portion
3 Crown main groove
4 Shoulder main groove
5 Crown land portion
6 Middle land portion
7 Shoulder land portion
10 First middle lateral groove
11 First groove portion
12 Second groove portion
15 Straight groove edge
16 Stepped groove edge
20 Second middle lateral groove
23 Third groove portion
24 Fourth groove portion
25 Straight groove edge
26 Stepped groove edge
30 First middle slot
35 First middle sipe
40 Second middle slot
45 Second middle sipe
61 First middle block
62 Second middle block

The invention claimed is:

1. A pneumatic tire having a tread portion provided with
a pair of crown main grooves disposed on both outer sides of the tire equator and extending continuously in the tire circumferential direction,
a pair of shoulder main grooves disposed axially outer side of the crown main groove and extending continuously in the tire circumferential direction,
a crown land portion disposed between the pair of the crown main grooves,
a pair of middle land portions disposed between the crown main groove and the shoulder main groove, and
a pair of shoulder land portions located in an axial outer side of the shoulder main groove;
wherein
at least one of the middle land portions is divided into a plurality of middle blocks by a plurality of middle lateral grooves connecting the crown main groove and the shoulder main groove;
the middle lateral grooves comprise first middle lateral grooves and second middle lateral grooves disposed alternately in the tire circumferential direction;
the first middle lateral grooves comprises a first groove portion communicating with the crown main groove and a second groove portion communicating with the shoulder main groove and having a smaller groove width than an axial inner edge of the first groove portion;

the second middle lateral grooves comprises a third groove portion communicating with the shoulder main groove and a fourth groove portion communicating with the crown main groove and having a smaller groove width than an axial inner edge of the third groove portion; and the middle land portion is provided in the vicinity of the second groove portion with a first middle slot extending from the shoulder main groove toward the crown main groove and comprising a first end portion terminating inside the middle land portion without communicating with the crown main groove, and in the vicinity of the fourth groove portion with a second middle slot extending from the crown main groove toward the shoulder main groove and comprising a second end portion terminating inside the middle land portion without communicating with the shoulder main groove.

2. The pneumatic tire according to claim 1, wherein the middle land portion comprises a first middle sipe extending from the first end portion toward the crown main groove and terminating inside the middle land portion without communicating with the crown main groove, and a second middle sipe extending from the second end portion toward the shoulder main groove and terminating inside the middle land portion without communicating with the shoulder main groove.

3. The pneumatic tire according to claim 2, wherein a ratio Ssp1/Wm between an axial length Ssp1 of the first middle sipe and an axial length Wm of the middle land portion is in a range of from 0.38 to 0.58, and a ratio Ssp2/Wm between an axial length Ssp2 of the second middle sipe and the axial length Wm of the middle land portion is in a range of from 0.38 to 0.58.

4. The pneumatic tire according to claim 1, wherein an axial length Sst1 of the first middle slot is smaller than an axial length Sm2 of the second groove portion, and an axial length Sst2 of the second middle slot is smaller than an axial length Sm4 of the fourth groove portion.

5. The pneumatic tire according to claim 4, wherein the axial length Sst1 of the first middle slot and the axial length Sst2 of the second middle slot are in a range of from 5 to 10 mm, and the axial length Sm4 of the second groove portion and the axial length Sm2 of the axial length Sm4 are in a range of from 11 to 18 mm.

6. The pneumatic tire according to claim 1, wherein a groove depth Dm1 of the first groove portion is larger than a groove depth Dm2 of the second groove portion, and a groove depth Dm3 of the third groove portion is larger than a groove depth Dm4 of the fourth groove portion.

7. The pneumatic tire according to claim 6, wherein a ratio Dm2/Dm1 between a groove depth Dm1 of the first groove portion and a groove depth Dm2 of the second groove portion is in a range of from 0.5 to 0.9, and a ratio Dm4/Dm3 between a groove depth Dm3 of the third groove portion and a groove depth Dm4 of the fourth groove portion is in a range of from 0.5 to 0.9.

8. The pneumatic tire according to claim 1, wherein in the plurality of the middle blocks, circumferentially-long first middle blocks and circumferentially-short second middle blocks, which are shorter than the first middle blocks, are arranged alternately.

9. The pneumatic tire according to claim 8, wherein a ratio Lm2/Lm1 between a circumferential length Lm1 of the first middle block and a circumferential length Lm2 of the second middle block is in a range of from 0.6 to 0.9.

10. The pneumatic tire according to claim 8, wherein the first middle slot, the second middle slot, the first middle sipe, and the second middle sipe are provided in the first middle block.

11. The pneumatic tire according to claim 8, wherein the middle lateral groove comprises a straight groove edge formed in a linear shape, and a stepped groove edge disposed diagonally to the straight groove edge and comprising the stepped groove edge formed in a stepped shape.

12. The pneumatic tire according to claim 11, wherein the first middle blocks are disposed between the adjacent stepped groove edges, and the second middle blocks are disposed between the adjacent straight groove edges.

* * * * *